United States Patent
Kang et al.

[11] Patent Number: 6,130,927
[45] Date of Patent: Oct. 10, 2000

[54] GRID WITH NOZZLE-TYPE COOLANT DEFLECTING CHANNELS FOR USE IN NUCLEAR REACTOR FUEL ASSEMBLIES

[75] Inventors: Heung Seok Kang; Kee Nam Song, both of Yusong-ku; Kyung Ho Yoon, Suh-ku; Youn Ho Jung, Yusong-ku; Tae Hyun Chun, Yusong-ku; Dong Seok Oh, Yusong-ku; Wang Kee In, Yusong-ku; Je Geon Bang, Yusong-ku, all of Rep. of Korea

[73] Assignees: Korean Atomic Energy Research Institute; Korea Electric Power Corporation, both of Seoul, Rep. of Korea

[21] Appl. No.: 09/207,184

[22] Filed: Dec. 8, 1998

[30] Foreign Application Priority Data

Dec. 12, 1997 [KR] Rep. of Korea ............ 97-68258

[51] Int. Cl.[7] ............................................. G21C 3/34
[52] U.S. Cl. ................................... 376/462; 376/439
[58] Field of Search ............................ 376/439, 443, 376/462

[56] References Cited

U.S. PATENT DOCUMENTS

| | | |
|---|---|---|
| 4,726,926 | 2/1988 | Patterson et al. . |
| 4,728,489 | 3/1988 | Hatfield . |
| 4,756,878 | 7/1988 | King et al. ............... 376/439 |
| 4,849,161 | 7/1989 | Brown et al. ............ 376/439 |
| 4,957,697 | 9/1990 | Wada . |
| 5,084,237 | 1/1992 | Patterson et al. ........ 376/442 |
| 5,259,009 | 11/1993 | Patterson et al. ........ 376/439 |
| 5,278,883 | 1/1994 | Patterson et al. ........ 376/439 |
| 5,444,748 | 8/1995 | Beuchel et al. . |

Primary Examiner—Charles T. Jordan
Assistant Examiner—K. Kevin Mun
Attorney, Agent, or Firm—Bachman I& LaPointe, P.C.

[57] ABSTRACT

A grid with coolant deflecting channels for used in nuclear fuel assemblies is disclosed. In the grid, two sets of intersecting grid strips are arranged in sets at right angles to each other prior to being encircled by four perimeter strips, thus forming a plurality of four-walled cells individually placing and supporting an elongated fuel rod therein. Each of the grid strips is made up of two narrow sheets which are deformed at a plurality of regularly spaced portions to provide nozzle-type coolant deflecting channels. The channels individually have an upright Y-shaped or reversed Y-shaped configuration capable of so deflecting coolant as to mix low temperature coolant with high temperature coolant. The channels thus form a uniform temperature distribution within a fuel assembly. The channels are so inclined with respect to the axes of the fuel rods as to form wide and linear positioning springs at middle portions thereof. The middle portions of the channels thus individually have a dual function of a deflecting channel for coolant and a positioning spring for the fuel rods.

7 Claims, 7 Drawing Sheets

GRID WITH NOZZLE-TYPE COOLANT DEFLECTING CHANNELS FOR USE IN NUCLEAR REACTOR FUEL ASSEMBLIES

BACKGROUND OF THE INVENTION

1. Field of the Invention

The present invention relates, in general, to grids used for placing and supporting fuel rods in a nuclear reactor fuel assembly and, more particularly, to a grid with nozzle-type coolant deflecting channels for use in such a nuclear fuel assembly, the grid being so designed as to effectively deflect coolant, thus mixing lower temperature coolant with high temperature coolant within the assembly and improving heat transferring effect between the fuel rods and the coolant, the grid also protecting the fuel rods from fretting wear due to a swirling motion or a lateral circulation of the coolant, and being reduced in the thickness of the intersecting grid strips while maintaining a desired buckling strength of said strips, thus allowing the coolant to more smoothly flow in the assembly and thereby reducing pressure drop of the coolant while effectively resisting laterally directed forces acting on the grids.

2. Description of the Prior Art

In typical light water reactors, a plurality of elongated nuclear fuel rods 125 are regularly and parallelly arranged in an assembly 101 having a square cross-section in a way such that, for example, fourteen, fifteen, sixteen or seventeen fuel rods 125 are regularly arranged along each side of said square cross-section, thus forming a 14×14, 15×15, 16×16, or 17×17 array as shown in FIG. 1. In such a nuclear fuel assembly 101, the elongated fuel rods 125 are typically fabricated by containing a fissionable fuel material, such as uranium core, within a hermetically sealed elongated zircaloy tube 114, known as the cladding. In order to place and support such fuel rods 125 within the assembly 101, a plurality of spacer grids 110 are used. Each of such grids 110 is produced by welding a plurality of intersecting inner strips to each other into an egg-crate pattern prior to encircling the periphery of the grid 110 by four perimeter strips. The top and bottom of the fuel assembly 101 are, thereafter, covered with pallets 111 and 112, respectively. The assembly 101 is thus protected from any external loads acting on the top and bottom thereof. The spacer grids 110 and the pallets 111 and 112 are integrated into a single structure using a plurality of guide tubes 113. A framework of the assembly 101 is thus fabricated.

Each of the above spacer grids 110 is fabricated as follows. As best seen in FIG. 2, two sets of inner strips 115 and 116, individually having a plurality of notches at regularly spaced portions, are assembled with each other by intersecting the two sets of strips 115 and 116 at said notches, thus forming a plurality of four-walled cells individually having four intersections 117. The assembled strips 115 and 116 are, thereafter, welded together at said intersections 117 prior to being encircled by perimeter strips 118, thus forming a spacer grid 110 with such four-walled cells. As shown in FIG. 3, a plurality of positioning springs 119 and a plurality of positioning dimples 120 are integrally formed on or attached to the inner strips 115 and 116 in a way such that the springs 119 and the dimples 120 extend inwardly with respect to each of said four-walled cells. In such a case, the dimples 120 are more rigid than the springs 119. In each four-walled cell, the positioning springs 119 force a fuel rod 125 against associated dimples 120, thus elastically positioning and supporting the fuel rod 125 at four points within each of said cells. In the typical nuclear fuel assembly 101, a plurality of grids 110 are regularly and perpendicularly arranged along the axes of the fuel rods 125 at right angles, thus placing and supporting the fuel rods 125 at multiple points. That is, the grids 110 form a multi-point support means for placing and supporting the fuel rods 125 within a nuclear fuel assembly 101.

In such an assembly 101, the positioning springs 119 elastically and slightly force the fuel rods 119 against the dimples 120 in a way such that the fuel rods 125 are slidable on the support points of both the springs 119 and the dimples 120 when the fuel rods 125 are elongated due to irradiation induced growth during a circulation of the coolant within the assembly 101. When the fuel rods 125 are fixed to the grids 110 at the support points, the fuel rods 125 may be bent at portions between the support points of the grids 110, thus undesirably reducing the intervals between the fuel rods 125 of the assembly 101 as shown in FIG. 4.

In some typical nuclear reactors using water as coolant, water receives thermal energy from the fuel rods 125 prior to converting the thermal energy into electric energy. During an operation of a nuclear fuel assembly 101 of such a reactor, water or liquid coolant is primarily introduced into the assembly 101 through an opening formed on the core supporting lower plate of the reactor. In the assembly 101, the coolant flows upwardly through the passages, defined between the fuel rods 125, and receives thermal energy from the fuel rods 125. In such a case, the sectioned configuration of the coolant passages provided in the fuel assembly 101 is shown in FIG. 4.

Typically, the amounts of thermal energy generated from different nuclear fuel assemblies 101 are not equal to each other. Since the assemblies 101 individually have a rectangular configuration with the elongated, parallel fuel rods 125 being closely spaced apart from each other at irregular intervals, the temperature of coolant flowing around the fuel rods 125 is variable in accordance with positions. That is, the amount of thermal energy, received by water flowing around the corners 123 of each four-walled cell, is less than that received by water flowing around the fuel rods 125. The coolant passages of typical fuel assemblies 101 thus undesirably have low temperature regions. Such low temperature regions reduce the thermal efficiency of the nuclear reactor. The coolant passages of the fuel assemblies 101 may also have partially overheated regions at positions adjacent to the fuel rods 125 having a high temperature. Such partially overheated regions deteriorate soundness of the assemblies 101. In order to remove such partially overheated regions from a nuclear fuel assembly 101, it is necessary to design the grid in a way such that a uniform temperature distribution is formed in the fuel assembly 101. The grid is also designed to effectively deflect and mix the coolant within the assemblies 101. Such effectively mixed coolant makes uniform the increase in enthalpy and maximizes the core output. Typical examples of such designed grids are disclosed in Korean Patent Publication Nos. 91-1978 and 91-7921.

In the grids disclosed in the above Korean patents, so-called "mixing blades" or "vanes" are attached to the upper portion of each grid and are used for mixing coolants within the fuel assembly. That is, the mixing blades or vanes allow the coolant to flow laterally in addition to normally longitudinally, and so the coolants are effectively mixed with each other between the channels and between the lower temperature regions and the partially overheated regions of the fuel assembly.

On the other hand, a coolant mixing grid, comprising two sets of intersecting inner strips individually made up of two flat, narrow sheets deformed to provide channels for coolant, is disclosed in U.S. Pat. No. 4,726,926. In the above grid, the upper or lower portion of each channel is inclined relative to the axes of the fuel rods at an angle of inclination, thus producing a swirling motion of coolant at the inlet and outlet of said channels. Such a swirling motion of coolant improves the heat transferring effect between the fuel rods and the coolant within a nuclear fuel assembly.

The above Korean or U.S. grids, designed to form a lateral flow of coolant or to deflect and mix the coolant within a nuclear fuel assembly, are somewhat advantageous in that they more effectively mix the coolant and improve the heat transferring effect between the fuel rods and the coolant within a nuclear fuel assembly. However, such a grid is problematic in that the lateral flow or mixing of coolant regrettably vibrates the elongated, parallel, closely spaced fuel rods within the assembly. As described above, the fuel rods 125 are supported by both the positioning springs 119 and the positioning dimples 120 within the four-walled cells of the grids 110. However, during an operation of a nuclear fuel assembly 101, the fuel rods 125 quickly and periodically interfere with the intersecting strips of the grids due to vibrations caused by the lateral flow of coolant. When the fuel rods 125 are so vibrated for a lengthy period of time, the claddings of the fuel rods 125 are repeatedly and frictionally abraded at their contact parts at which the fuel rods 125 are brought into contact with the springs and dimples of the grids. The claddings are thus reduced in their thicknesses so as to be finally perforated at said contact parts. Such an abrasion of the fuel rods is so-called fretting wear in the art.

Such a fretting wear may be referred to Korean Patent Publication No. 94-3799 in detail. The laterally directed force caused by the mixing blades of the grids is in proportion to the coolant mixing effect and directly affects the thermal transferring effect of nuclear reactors. However, such a laterally directed force of the mixing blades also proportionally increases the amplitude of vibration of the fuel rods. This may cause damage to the fuel rods.

The important factors necessary to consider while designing the grids for use in nuclear fuel assemblies are improvement in both the fuel rod supporting function of the grids and the buckling strength resisting of such a laterally directed force acting on said grids. During an operation of a nuclear reactor, the fuel assemblies may be vibrated laterally due to a load acting on the assemblies and this causes an interference between the assemblies. Therefore, the grids of the fuel assemblies may be impacted due to such an interference between the assemblies as disclosed in U.S. Pat. No. 4,058,436. In the prior art, the grid's buckling strength, resisting a lateral load acting on the grid, is reduced since the grid strips have to be partially cut away through, for example, a stamping process at a plurality of portions so as to form positioning springs and dimples within a fuel assembly. Such cut-away portions reduce the effective cross-sectional area of the grid capable of resisting impact, thus reducing the buckling strength of the grid.

In a grid disclosed in U.S. Pat. No. 5,243,634, the positioning springs are individually integrated with an associated grid strip at one point, thus forming a cantilever structure. Such a cantilever spring is more flexible than a simple spring which is integrated with a grid strip at opposite ends thereof. In the mixing grid disclosed in the above-mentioned U.S. Pat. No. 4,726,926, the deformed portions, provided on the sheets of the intersecting grid strips for forming the channels for coolant, act as channel-shaped positioning springs used for placing and supporting the fuel rods within the four-walled cells. Since the sheets of the strips are not cut away but deformed to form such channel-shaped springs, flexibility of such channel-shaped springs is exceedingly less in comparison with the above-mentioned cantilever springs, thus failing to provide desired flexibility expected by conventional positioning springs. The channel-shaped springs thus act as dimples rather than springs. Therefore, the mixing grid, having such channel-shaped dimples, is problematic in that said dimples may cause the fuel rods to be undesirably bent when the fuel rods are elongated due to the irradiation induced growth during an operation of the reactor or to be scratched at the claddings when the fuel rods are inserted into the cells of the grids.

SUMMARY OF THE INVENTION

Accordingly, the present invention has been made keeping in mind the above problems occurring in the prior art, and an object of the present invention is to provide a grid with nozzle-type coolant deflecting channels for use in nuclear fuel assemblies, which is so designed as to effectively mix low temperature coolant with high temperature coolant, thus preventing partial overheating of fuel rods and improving the thermal efficiency of a nuclear reactor, and which does not cause a swirling motion or a lateral circulation of the coolant within a fuel assembly, thus protecting the fuel rods from fretting wear.

Another object of the present invention is to provide a grid for use in nuclear fuel assemblies, of which the intersecting inner strips are slightly reduced in the thickness, thus reducing resistance to the flow of coolant within the assembly, and are not cut away at any portion, thus maintaining a desired effective sectional area and thereby having a desired buckling strength capable of effectively resisting lateral load acting thereon.

A further object of the present invention is to provide a grid for use in nuclear fuel assemblies, of which the intersecting inner strips have a reduced thickness and have channel-shaped positioning springs specifically designed to form a substantially longer interval between the fuel rod support points of grids, thus being increased in flexibility twice in comparison with typical grids having positioning springs and dimples, and which thus overcomes the problems experienced in typical channel-shaped dimples, for example, shown in U.S. Pat. No. 4,726,926.

In order to accomplish the above objects, a grid with coolant deflecting channels for used in a nuclear fuel assembly in accordance with this invention, comprises: two sets of intersecting grid strips arranged in sets at an angle to each other prior to being encircled by a perimeter strip, thus forming a plurality of four-walled cells individually placing and supporting an elongated fuel rod therein, each of said grid strips being made up of two narrow sheets deformed to provide nozzle-type coolant deflecting channels, said channels individually having an upright Y-shaped or reversed Y-shaped configuration capable of so deflecting coolant as to mix low temperature coolant with high temperature coolant and to form a uniform temperature distribution within the fuel assembly.

The coolant deflecting channels of this invention are specifically designed as follows. Each of the channels is gradually increased in the cross-sectional area within the region from the inlet to the middle portion, thus forming a diffuser. Each channel is, thereafter, gradually reduced in the cross-sectional area within the remaining region from the middle portion to the outlet, thus forming a nozzle. The middle portion of each channel thus acts as a positioning spring used for placing and supporting an elongated fuel rod within a four-walled cell of the grid.

Due to the specifically designed configuration of the channels, the coolant flows through the middle portion of each channel at a low speed and at a high pressure, thus giving the middle portion an additional spring force.

The outlet or the nozzle of each channel discharges the coolant from the channel at a high speed, thus improving the coolant mixing effect of the channel. In order to allow the channels of this invention to accomplish a desired operational function as expected from conventional positioning springs used for placing and supporting fuel rods within a fuel assembly, it is necessary to set the thickness of each sheet of the grid strip to about 0.15 mm–0.3 mm and the width of the middle portion of the channel to about 6 mm to 9 mm.

BRIEF DESCRIPTION OF THE DRAWINGS

The above and other objects, features and other advantages of the present invention will be more clearly understood from the following detailed description taken in conjunction with the accompanying drawings, in which:

FIG. 7b is a partial perspective view of the grid of FIG. 7a;

FIGS. 8 and 9 are perspective views, showing the configuration of two sets of grid strips to be arranged in sets at right angles to each other in order to form the grid of FIG. 5, in which:

FIG. 8 shows a first grid strip arranged in parallel to a side of the assembly; and FIG. 9 shows a second grid strip arranged in sets at right angles to the first strip of FIG. 8;

FIG. 13b is a partial perspective view of the grid of FIG. 13a.

DESCRIPTION OF THE PREFERRED EMBODIMENTS

Figure 1:
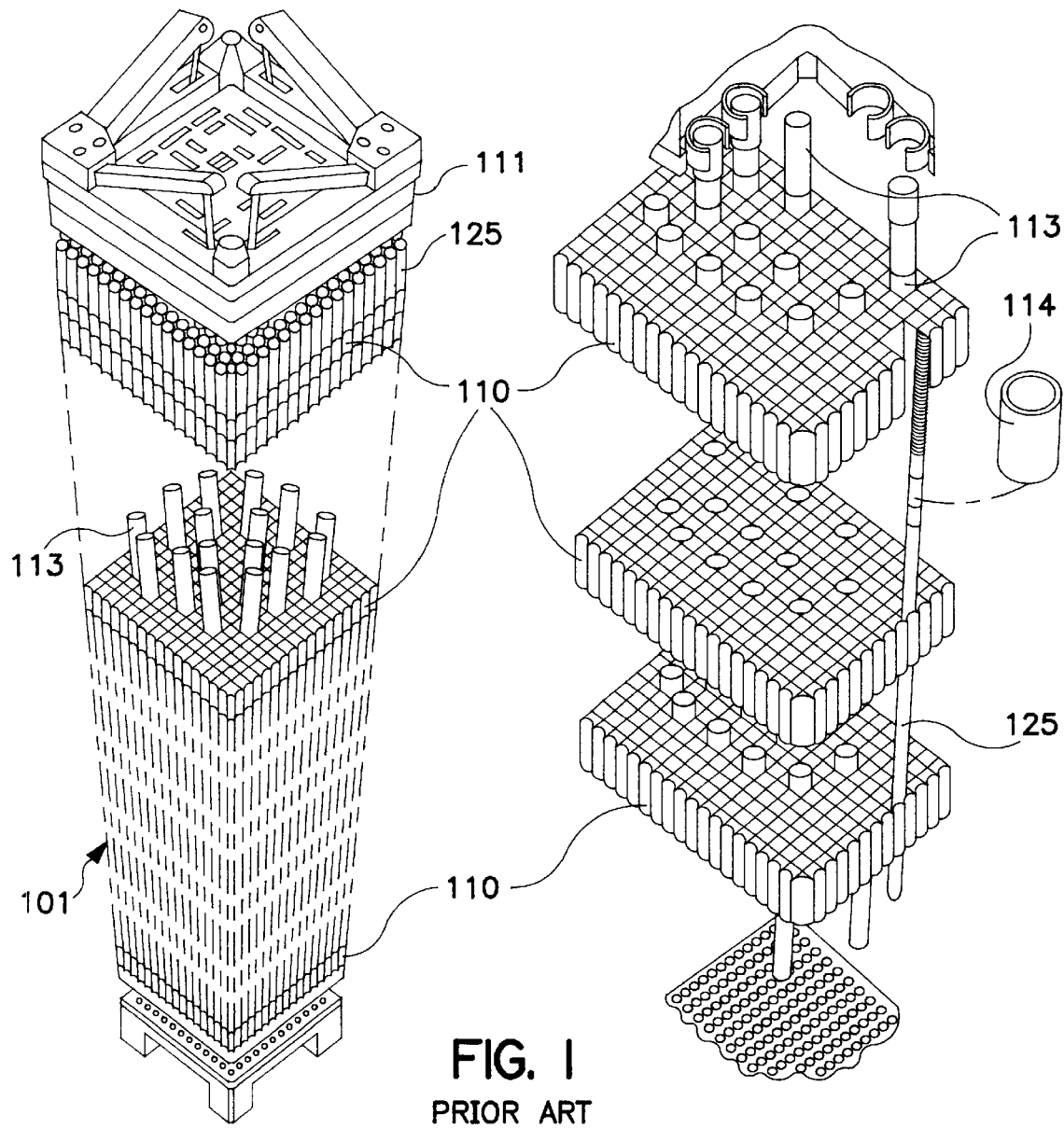
FIG. 1 is a perspective view, showing the construction of a typical nuclear fuel assembly for use in pressurized light water reactors.
Figure 2:
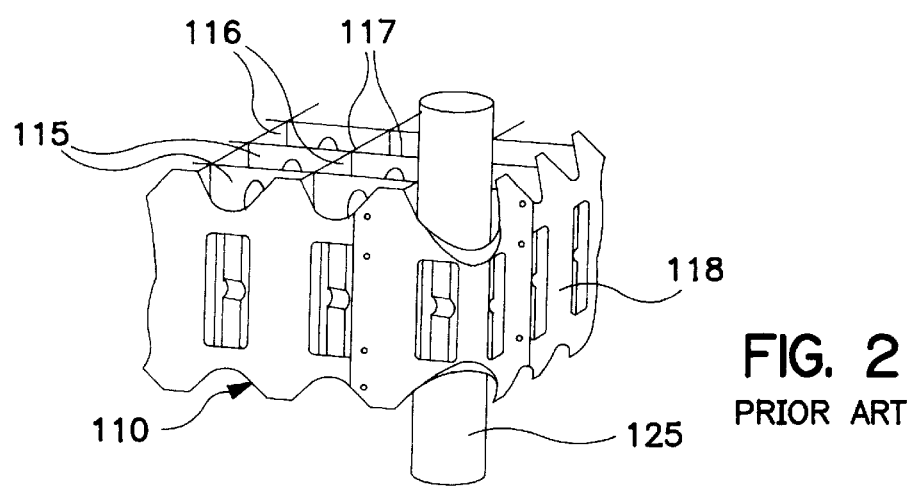
FIG. 2 is a partial perspective view, showing a typical spacer grid used for placing and supporting elongated fuel rods within the fuel assembly of FIG. 1.
Figure 3:
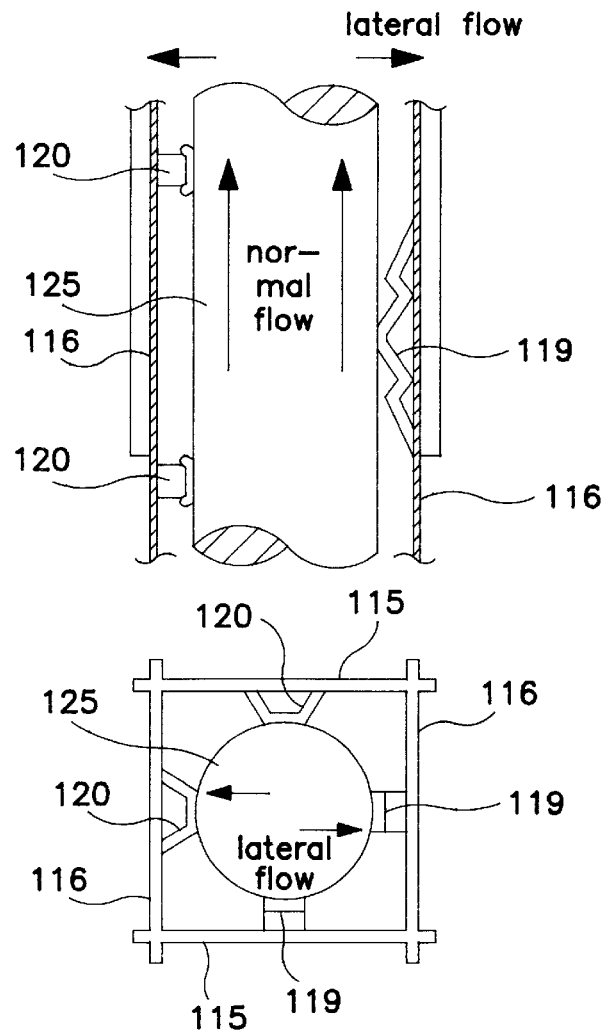
FIG. 3 shows a fuel rod, placed and supported by positioning springs and dimples within a four-walled cell of the grid of FIG. 2, in a front view and a cross-sectional view.
Figure 4:
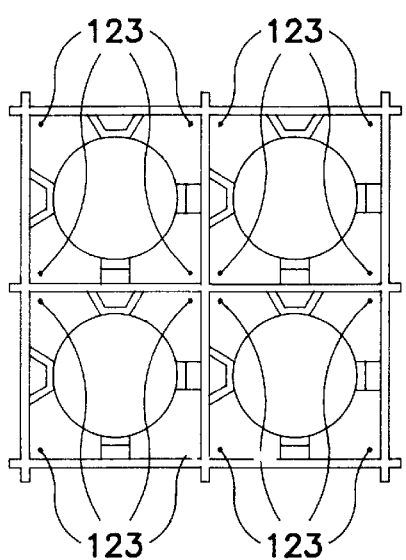
FIG. 4 is a cross-sectional view, showing four fuel rods individually placed and supported within a four-walled cell of the grid of FIG. 2 with coolant passages being formed around each fuel rod within each cell.
Figure 5:
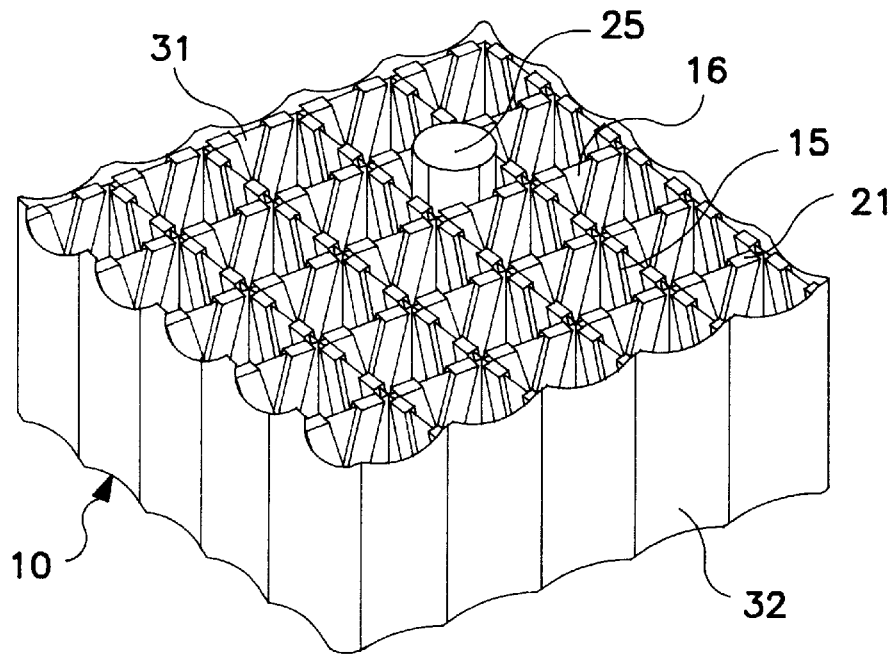
FIG. 5 is a perspective view of a spacer grid for use in nuclear fuel assemblies having a 5×5 array in accordance with an embodiment of the present invention.

FIG. 5 is a perspective view of a spacer grid for nuclear fuel assemblies in accordance with the primary embodiment of this invention. As shown in the drawing, the grid 10 of this invention comprises two sets of intersecting grid strips 15 and 16 which are arranged in sets at right angles to each other prior to being encircled by four perimeter strips 30, thus forming an egg-crate pattern. Each of the first and second strips 15 and 16 is made up of two narrow sheets which are formed through a stamping process, thus defining a plurality of coolant channels 29 on each grid strip. Each sheet of the above strips 15 and 16 is most preferably made of zircaloy, the alloy of tin, iron, chrome and zirconium. However, it should be understood that said strips may be preferably made of inconel which has been typically used as a material of such grid strips.

Figure 6:
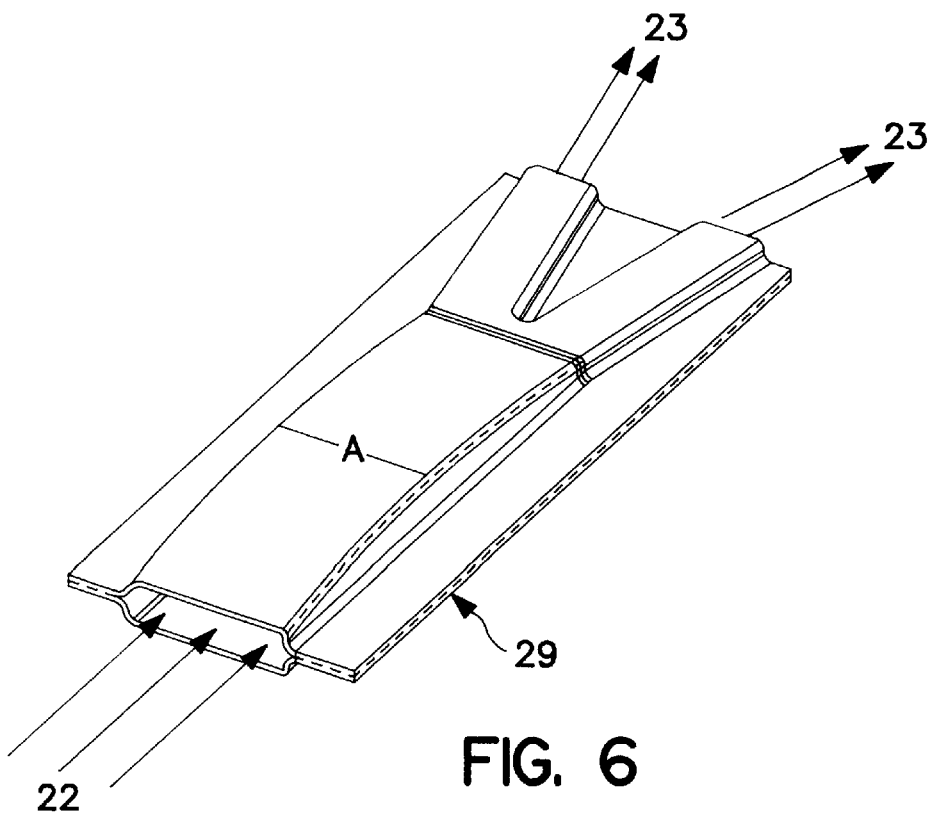
FIG. 6 is a partial perspective view, showing the configuration of a coolant channel formed on a grid strip included in the grid of FIG. 5.

In the embodiment of FIG. 5, four first grid strips 15 regularly intersect four second strips 16 at right angles prior to being encircled by the four perimeter strips 30, thus forming a grid 10 having a 5×5 array with twenty five cells. In this embodiment, the coolant channels 29 are designed to have a generally rectangular cross-section as best seen in FIG. 6. For ease of description, only one fuel rod 25 is shown as placed and supported within an associated cell in FIG. 5. The above channels 29 are specifically designed to forcibly circulate coolant from the high temperature regions 22 about the fuel rods 25 to the low temperature regions 23, thus causing the high temperature coolant to be effectively deflected prior to being mixed with the low temperature coolant. A uniform temperature distribution is thus formed within the fuel assembly.

FIG. 6 is a partial perspective view, showing the configuration of the coolant channel 29. As shown in the drawing, the channel 29 has an upright Y-shaped configuration with one inlet being formed around the high temperature region 22 and two outlets or nozzles 21 being formed around the lower temperature regions 23. The cross-sectional area of the inlet is larger than the summed cross-sectional area of the two outlets or nozzles 21. In addition, the cross-sectional area of the channel 29 gradually varies along the axis of the channel 29 in a way such that the middle portion "A" of the channel 29 has the largest cross-sectional area which is almost twice as large as that of the inlet.

Figure 7A:
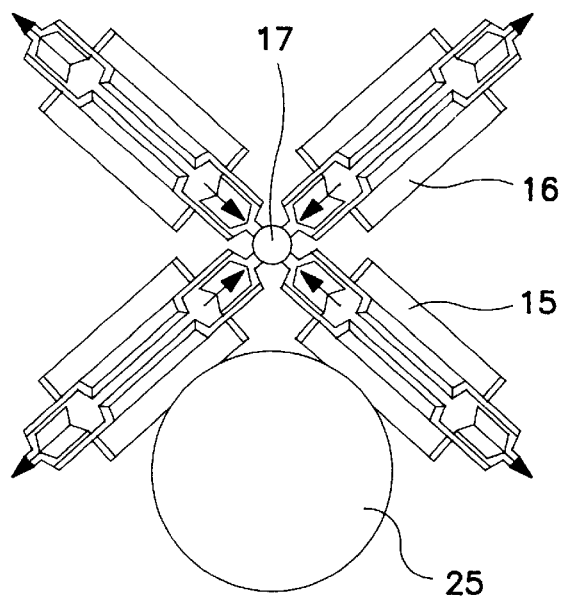
FIG. 7a is a partial plan view, showing the top of the grid of FIG. 5 with four coolant channels being formed around each intersection of grid strips.
Figure 7B:
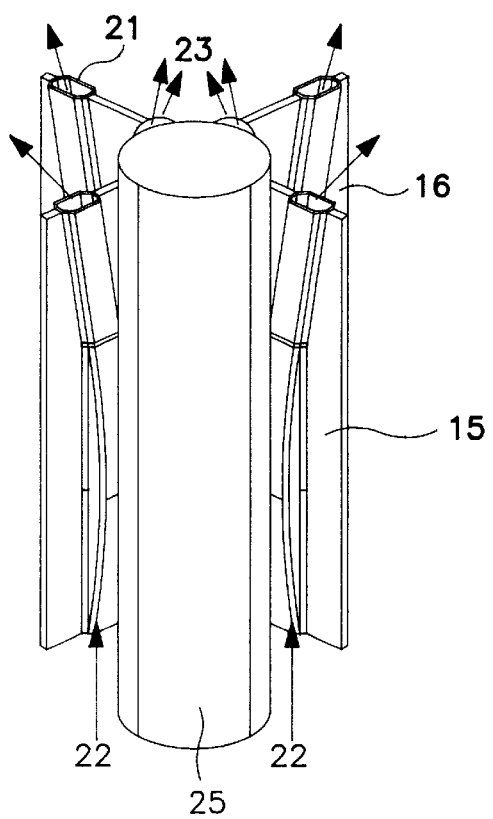

FIG. 7a is a partial plan view, showing the top of the grid of FIG. 5 with four coolant channels 29 being formed around each intersection 17 of the two grid strips 15 and 16. FIG. 7b is a partial perspective view of FIG. 7a.

Figure 8:
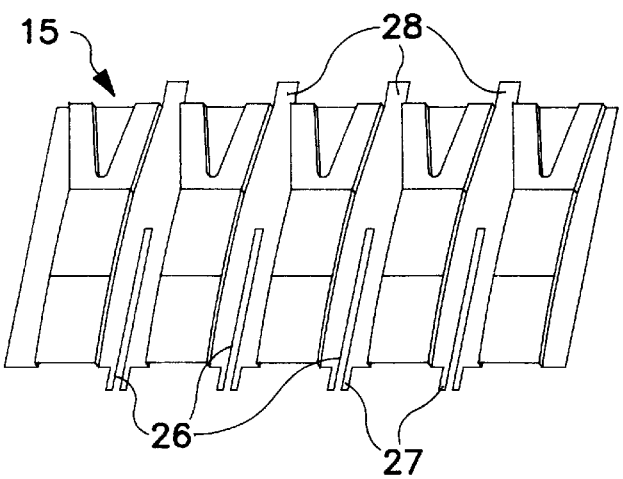
Figure 9:
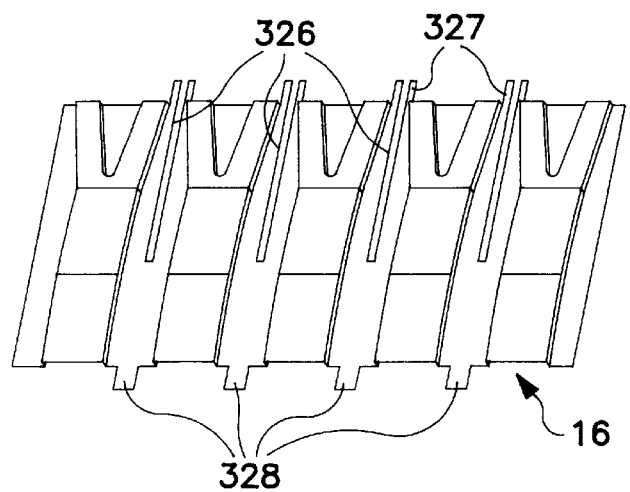
Figure 10:
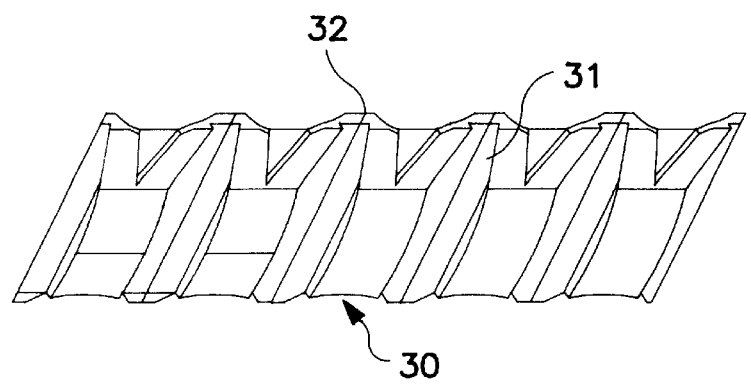
FIG. 10 is a perspective view, showing the configuration of a perimeter strip of the grid of FIG. 5.

The first and second grid strips 15 and 16 and the perimeter strip 30 are shown in FIGS. 8, 9 and 10, respectively. FIG. 8 shows the configuration of the first strip 15, while FIG. 9 shows the second strip 16 arranged in sets at right angles to the first strip 15.

The two sets of grid strips 15 and 16 are different from each other in the position of notches 26 and 326 at which the strips 15 and 16 intersect each other at right angles to form a grid 10. In order to fabricate the grid 10, two narrow sheets are integrated into each grid strip 15, 16 in a way such that the channels 29 are defined on the resulting grid strip. After forming a plurality of grid strips 15 and 16 in the same manner as described above, the strips 15 and 16 are arranged in sets at right angles to each other, thus forming a plurality of four-walled cells. In such a case, the number of grid strips 15 and 16 to be used for fabricating a grid is twice as many as the number of notches 26, 326 of each strip since the grid has to have a square array.

At the intersections of the two sets of grid strips 15 and 16, the taps 27 of the first strips 15 engage with the taps 328 of the second strip 16, respectively. The two sets of strips 15 and 16 are welded together at said taps 27 and 328 through a TIG welding process or a laser beam welding process, thus forming the welded intersections 17 and 317 with a plurality of four-walled cells for the fuel rods as shown in FIGS. 7a and 7b.

The perimeter strips 30, free from notches or taps different from the above-mentioned intersecting grid strips 15 and 16, are individually made up of two narrow sheets. In each of the four perimeter strips 30, the inside sheet 31 is deformed in the same manner as that described for the sheets of the intersecting grid strips 15 and 16, thus forming a plurality of coolant channels. Meanwhile, the outside sheet 32 of each perimeter strip 30 is not deformed, but has a flat, narrow configuration. The top and bottom edges of the inside sheet 31 of each perimeter strip 30 are cut away into the same configuration as those of the outside sheet, and so the top and bottom edges of the two sheets 31 and 32 have the same curved configuration. The curved configuration of both edges of the perimeter strips 30 is best seen in FIG. 5 and FIG. 10.

The four perimeter strips 30, as best shown in FIG. 10, individually comprising the two sheets 31 and 32 with coolant channels, encircle the intersecting grid strips 15 and 16. The perimeter strips 30 are, thereafter, welded together, thus forming a grid for used in a nuclear fuel assembly. When producing each of the grid and perimeter strips, it is preferable to integrate two narrow sheets into a strip through an electric resistance spot welding process. In addition, the grid is preferably fabricated by intersecting the two sets of grid strips at the notches and welding the intersecting grid strips to each other at said notches.

Figure 11:
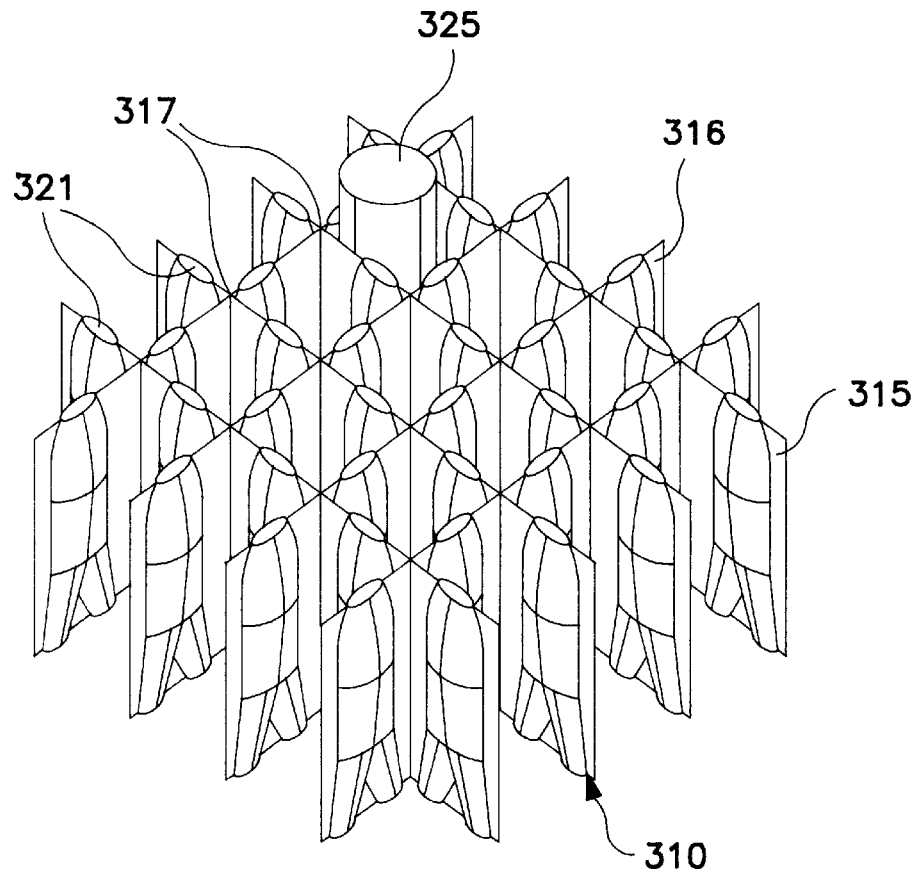
FIG. 11 is a perspective view of a spacer grid in accordance with another embodiment of the present invention.
Figure 12:
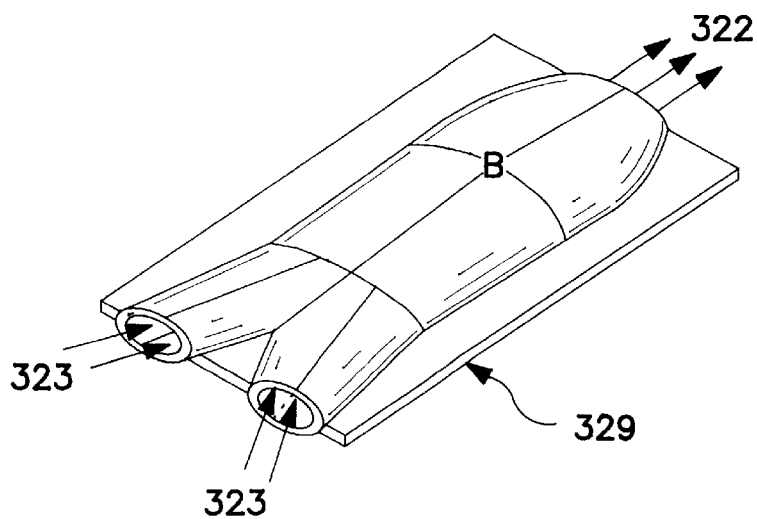
FIG. 12 is a partial perspective view, showing the configuration of a coolant channel formed on a grid strip included in the grid of FIG. 11.

FIG. 11 is a perspective view of a spacer grid in accordance with the second embodiment of this invention. FIG. 12 is a partial perspective view, showing the configuration of a coolant channel formed on a grid strip included in the grid of FIG. 11. In this embodiment, the coolant channels 329 of the grid 310 have an elliptical cross-section. As shown in FIGS. 11 and 12, the above elliptical channels 329 are specifically designed to have a reversed Y-shaped configuration with two inlets being formed around the low temperature regions 323 and one outlet or nozzle 321 being formed around the high temperature region 322. Therefore, the channels 329 of this embodiment forcibly circulate coolant from the low temperature regions 323 to the high temperature regions 322 about the fuel rods 325 in a manner reversed to that described for the channels 29 of the primary embodiment. At any rate, the channels 329 cause the low temperature coolant to be effectively mixed with the high temperature coolant, thus forming a uniform temperature distribution the fuel assembly. The cross-sectional area of each channel 329 gradually varies along the axis of the channel 329 in a way such that the middle portion "B" of the channel 329 has the largest cross-sectional area which is almost twice as large as the summed cross-sectional area of the two inlets. That is, each of the channels 329 is gradually increased in the cross-sectional area within the region from the inlets to the middle portion "B", thus forming a diffuser. Each channel 329 is, thereafter, gradually reduced in the cross-sectional area within the remaining region from the middle portion "B" to the outlet 321, thus forming a nozzle. The cross-sectional area of the outlet 321 is smaller than the summed cross-sectional area of the two inlets.

In the present invention, the coolant channels of the grid may be selectively changed in the configuration without affecting the functioning of this invention between four designs: an upright Y-shaped configuration with a generally rectangular cross-section, an upright Y-shaped configuration with a generally elliptical cross-section, a reversed Y-shaped configuration with a generally rectangular cross-section, and a reversed Y-shaped configuration with a generally elliptical cross-section.

Figure 13A:
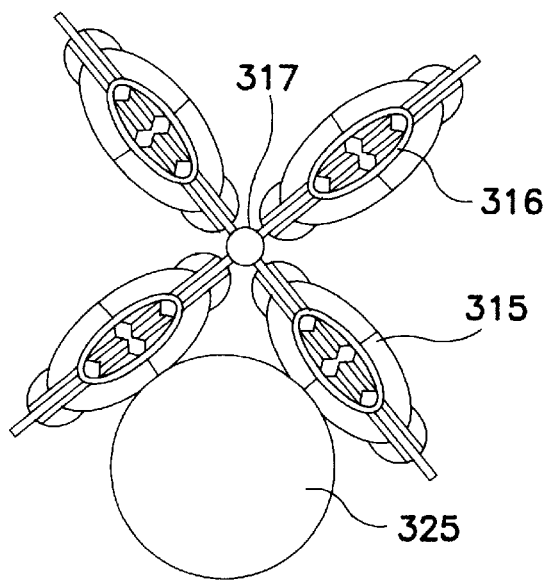
FIG. 13a is a partial plane view, showing the top of the grid of FIG. 11 with four coolant channels being formed around each intersection of grid strips.
Figure 13B:
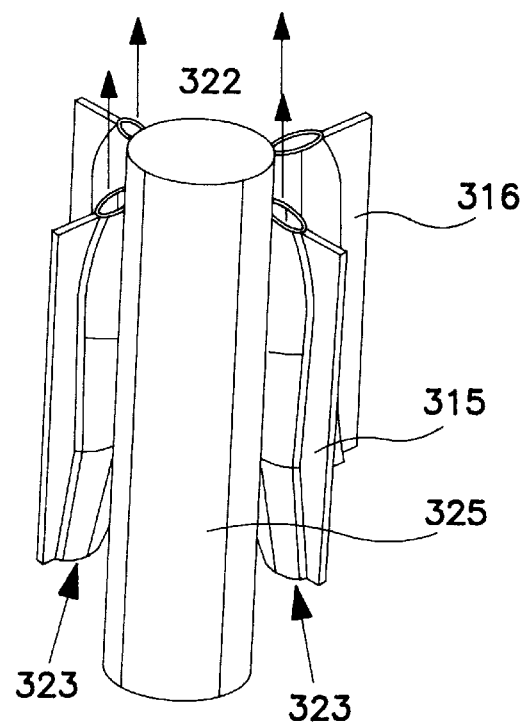

FIG. 13a is a partial plane view, showing the top of the grid 310 of FIG. 11 with four coolant channels being formed around each intersection of the grid strips. FIG. 13b is a partial perspective view of the grid of FIG. 13a. As shown in FIGS. 12, 13a and 13b, the configuration of each coolant channel 329 of the grid strips 315 and 316 is different from that of the strips 15 and 16 of the primary embodiment. However, the coolant channel 329 is designed to have a diffuser within the region from the inlets to the middle portion "B" and a nozzle within the remaining region from the middle portion "B" to the outlet 321, thus allowing the coolant to be discharged from the outlet 321 at a high speed as expected from a conventional nozzle.

In the present invention, it is most important to design the width dimension of the largest cross-sectional portion of a coolant channel 329 regardless of the rectangular or elliptical cross-section of said channel 329 since the largest cross-sectional portion acts as a positioning means for elastically and movably placing and supporting the fuel rods 325 in addition to the original function as a part of the coolant channel. In the channel-shaped dimples as shown by the character "A" of FIG. 6 or "B" of FIG. 12, each positioning dimple is so wide as to be substantially rigid in comparison with conventional cantilever springs, thus having a less flexibility failing to effectively and elastically support an elongated fuel rod. As well known to those skilled in the art, the displacement of a loaded beam is in proportion to the cube of an interval between the supported points of the beam and in proportion to a reciprocal of the cube of the beam's thickness. Therefore, in order to maximize the spring action of the channel-shaped positioning dimples of this invention, it is very important to set the dimension of both the width of the middle portion of the channel and the thickness of each sheet of the intersecting grid strip. When setting the thickness of each sheet to about 0.15 mm–0.3 mm and the width of the middle portion of each channel to about 6 mm to 9 mm, the channel-shaped dimples of the this invention accomplishes a desired operational function as expected from conventional positioning springs used for placing and supporting fuel rods within a fuel assembly.

As described above, the present invention provides a grid with nozzle-type coolant deflecting channels for use in nuclear fuel assemblies. In the grid of this invention, two types of grid strips are arranged in sets at right angles to each other prior to being encircled by four perimeter strips, thus forming a grid with a plurality of four-walled cells. Each of the intersecting grid strips comprises two narrow sheets which are deformed at a plurality of portions to provide coolant channels. The coolant channels are designed to forcibly deflect the coolant within a fuel assembly, thus mixing low temperature coolant with high temperature coolant and forming a uniform temperature distribution within the fuel assembly. The grid of this invention thus improves the thermal efficiency of a nuclear reactor. The above grid also effectively prevents the coolant from being partially overheated and this improves the soundness of the reactors. The coolant channels formed on the grid of this invention also act as positioning dimples for elongated fuel rods. Furthermore, the coolant channels are so designed as to have a varying cross-sectional area with the largest cross-sectional area being positioned at each dimple, and so the coolant provides the dimples with an additional spring action due to the highest coolant pressure at said dimples. The channels of this invention are more effectively used as positioning dimples for elongated fuel rods.

Due to the specifically designed channels, the grid of this invention effectively and violently mixes the low temperature coolant with high temperature coolant, thus improving thermal efficiency of a reactor without needing any swirling motion of coolant. Therefore, the grid of this invention allows the elongated fuel rods to be effectively protected from fretting wear caused by such a swirling motion of coolant.

The summed thickness of two sheets of each grid strip according to this invention is less than that of a conventional grid strip and this conserves the material of the intersecting grid strips. In addition, it is not necessary to cut away the grid strips to form the channel-shaped dimples of this invention, the effective cross-sectional area of the strips is not practically reduced and so the buckling strength of the strips resisting of any lateral load is not reduced. Such channel-shaped dimples, which are provided on the intersecting grid strips without being cut away different from the prior art, basically prevent any lateral circulation of coolant within a fuel assembly. The dimples of this invention thus prevent any vibration of the fuel rods due to a laterally directed force caused by such a lateral circulation of the coolant. It is thus possible to more effectively protect the elongated fuel rods from fretting wear.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A grid with coolant deflecting channels for use in a nuclear fuel assembly, comprising:

two sets of intersecting grid strips arranged in sets at an angle to each other prior to being encircled by a perimeter strip, thus forming a plurality of four-walled cells individually placing and supporting an elongated fuel rod therein, each of said grid strips being made up of two narrow sheets deformed to provide nozzle-type coolant deflecting channels, said channels individually having an upright Y-shaped or reversed Y-shaped configuration capable of so deflecting coolant as to mix low temperature coolant with high temperature coolant and to form a uniform temperature distribution within the fuel assembly.

2. The grid according to claim 1, wherein each of said channels varies in the cross-sectional area in a way such that the cross-sectional area of an outlet is smaller than that of an inlet, thus forming a nozzle capable of discharging the coolant at a high speed suitable for improving the coolant mixing effect of the channels.

3. The grid according to claim 1, wherein each of said channels has a generally rectangular or elliptical cross-section.

4. The grid according to claim 1, wherein said channels are so inclined with respect to the axes of the fuel rods as to form wide and linear positioning springs at middle portions thereof, the middle portions of the channels thus individually having a dual function of a deflecting channel for coolant and a positioning spring for the fuel rods.

5. The grid according to claim 1, wherein said perimeter strip comprises an inside sheet and an outside sheet, said inside sheet forming a plurality of coolant channels which have a Y-shaped configuration, said outside sheet having a flat, narrow configuration.

6. The grid according to claim 4, wherein the middle portion of each channel has a width of about 6 mm to 9 mm and a thickness of about 0.15 mm–0.3 mm.

7. The grid according to claim 4, wherein each of said channels is gradually increased in the cross-sectional area within a region from the inlet to the middle portion thereof, thus forming a diffuser with the middle portion having a largest cross-sectional area, the middle portion thus having an additional spring action due to the flow of coolant within the channel.

* * * * *